Oct. 17, 1961 A. H. BOTT ET AL 3,005,167

FREQUENCY MODULATION MULTIPLEX ARRANGEMENT

Filed March 14, 1958 2 Sheets-Sheet 1

INVENTORS
ADOLF H. BOTT &
FRANKLIN E. TALMAGE
BY [signature]
ATTORNEY

FREQUENCY MODULATION MULTIPLEX ARRANGEMENT

Filed March 14, 1958 2 Sheets-Sheet 2

INVENTORS
ADOLF H. BOTT &
FRANKLIN E. TALMAGE
BY G. A. Rechif
ATTORNEY 3,005,167
FREQUENCY MODULATION MULTIPLEX ARRANGEMENT

Adolf H. Bott, Collingswood, and Franklin E. Talmage, Westmont, N.J., assignors to Radio Corporation of America, a corporation of Delaware Filed Mar. 14, 1958, Ser. No. 721,407
14 Claims. (Cl. 332—21)

This invention relates to an arrangement for transmitting a multiplex signal, and more particularly to an arrangement for frequency modulating an oscillator by two or more separate intelligences.

During the last few years, a new frequency modulation (FM) broadcasting technique, namely multiplex, has received some attention. An FM multiplex system comprises a special transmitter and proper receiving equipment. A main audio program is frequency modulated onto the carrier, and in addition a subcarrier of supersonic frequency (for example, in the range of 32–67 kc.) is frequency modulated onto this carrier. This subcarrier in turn is frequency modulated by a second audio program, which may be termed an auxiliary program or sub-program. In multiplex terminology, the main program may be considered as one (the main) multiplex channel, while the frequency modulated subcarrier (or the audio program which is modulated onto this subcarrier) may be considered as a second multiplex channel, or sub-channel. A second or even a third modulated subcarrier may be added, if desired.

When it is attempted to use the ordinary or conventional reactance tube FM arrangement for multiplexing signals, severe cross-talk from the main channel into the sub-channel will result, primarily because to the substantial (standardized) difference in the signal strengths in these two channels. In addition, the signal-to-noise ratio in the sub-channel may be undesirably low.

An object of this invention is to provide a novel FM multiplex arrangement for transmitters.

Another object is to provide an arrangement for directly frequency modulating a carrier with a plurality of multiplex signals, but in which the cross-talk or interaction between channels is reduced to an unobjectionable level.

A further object is to provide a novel reactance tube FM circuit for transmitters.

The objects of this invention are accomplished, briefly, in the following manner: Two separate reactance tubes (one of which may itself actually be a push-pull reactance tube circuit comprising two tubes) are coupled to the tank coil of an oscillator which is to be frequency modulated. The main channel signal is fed to one of these two separate reactance tubes, and the sub-channel signal (a frequency modulated subcarrier) is fed to the other of these two separate reactance tubes. The reactance tube for the sub-channel may desirably be coupled to only a part of the oscillator coil. The use of of separate reactance tubes for the respective multiplex channels effects a decoupling of the two (or more) modulation circuits, thus keeping the cross-talk or interaction between the multiplex channels low.

A detailed description of the invention follows, taken in conjunction with the accompanying drawings, wherein.

Figure 1:
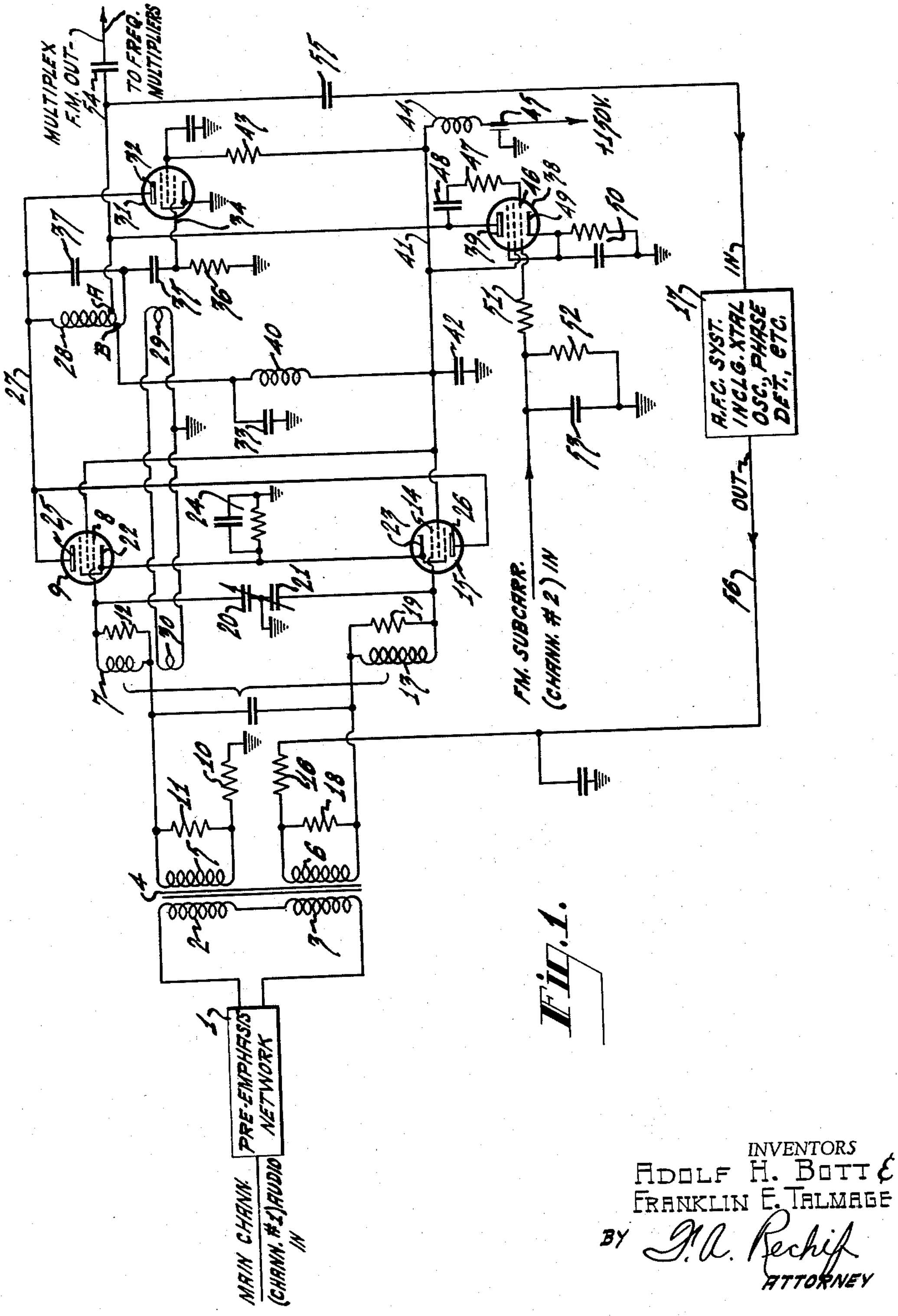
FIG. 1 is a circuit diagram of an FM arrangement according to this invention.

First referring to FIG. 1, the audio (or other modulating signal) constituting multiplex channel No. 1 is first fed through a line-terminating or impedance-matching network (not shown), and then to the input of a pre-emphasis network 1, which may be of the type commonly used in FM transmitters. For convenience, multiplex channel No. 1 will be hereinafter referred to as the "main channel," while multiplex channel No. 2 will be referred to as the "sub-channel." The output of network 1 is applied across the ends of two separate but series-connected primary windings 2 and 3 of a transformer 4 which has two secondary windings 5 and 6. One end of a secondary winding is connected through a transformer winding 7 to the control grid 8 of a pentode vacuum tube 9, for example of the 6AQ5 type. The opposite end of winding 5 is connected through a resistor 10 to a point of zero signal potential, such as ground. A resistor 11 is connected across winding 5, while a resistor 12 is connected across winding 7. One end of secondary winding 6 is connected through a transformer winding 13 to the control grid 14 of a pentode vacuum tube 15, for example of the 6AQ5 type. The opposite end of winding 6 is connected through a resistor 16 to the output of an automatic frequency control system 17, to be referred to hereinafter in more detail. A resistor 18 is connected across winding 6, while a resistor 19 is connected across winding 13.

In order to resonate or tune the windings 7 and 13, a variable capacitor 20 is connected from control grid 8 to ground, and a variable capacitor 21 is connected from control grid 14 to ground. Capacitors 20 and 21 are arranged for gang tuning, as illustrated.

The principles of push-pull are applied to the tubes 9 and 15, connected to serve as reactance tubes. The transformer windings 5 and 6 are arranged and connected to the respective grids 8 and 14 in such a way that the audio modulating potentials are supplied in phase displaced relation to the tubes 9 and 15; specifically, the modulating potentials are supplied antiphasally to these tubes.

The cathode 22 of tube 9 is connected to the cathode 23 of tube 15, and these two cathodes are connected through a common resistance-capacitance biasing network 24 to ground.

The anode 25 of tube 9 and the anode 26 of tube 15 are connected together and to a lead 27, which is connected to the upper end of an oscillator tank coil 28 for frequency modulation of the oscillator including this coil. Thus, the outputs of the tubes 9 and 15 are in parallel, and voltages from the tank coil are supplied to the anodes 25, 26 of tubes 9, 15 respectively. A capacitor 37 is connected across tank coil 28, to tune the same.

A coil 29 is inductively coupled to the oscillator coil 28. One end of coil 29 is grounded, and the ends of this coil are connected to the respective opposite ends of a transformer winding 30 which forms a part of the same transformer as windings 7 and 13. If two tuned circuits such as 28, 37 and either 7, 20 or 13, 21 are coupled with less than critical coupling, the phase shift between the two coupled circuits will be 90°. This less than critical coupling is achieved by the couplings between 29 and 28 and between 30 and 7 and 13. Due to the fact that windings 7 and 13 are connected in a push-pull arrangement, there will be a 90° lagging phase shift at grid 8 and 90° leading at grid 14. Consequently, the variable reactance of tube 9 is opposite in reactance polarity to that of tube 15 for equidirectional element voltage changes.

If the various phase relations (due to the quadrature feedback to both reactance tube grids and the antiphasal relationship of the two reactance tube grids with respect to each other) are such that tube 9 provides a capacitive reactance effect and tube 15 provides an inductive reactance, effect, then the following will happen. When the modualting potential supplied to control grid 8 goes up the capactive reactance effect of tube 9 is increased. Simultaneously, the modulating potential supplied to the grid 14 goes down, and this decreases the inductive reactance effect of tube 15. Thus, there are produced large reactive effects which quite linearly follow the modulating potentials supplied from the source to transformer 4. The main advantage of this type of circuit lies in the fact that the phase shifter (including coil 29) disclosed is highly efficient and may be adjusted so that the reactance tube circuit has a minimum loading effect on the circuit (tank coil 28) to be modulated. Also, the amplitude modulation is cancelled out, because of the use of push-pull principles.

Figure 3:
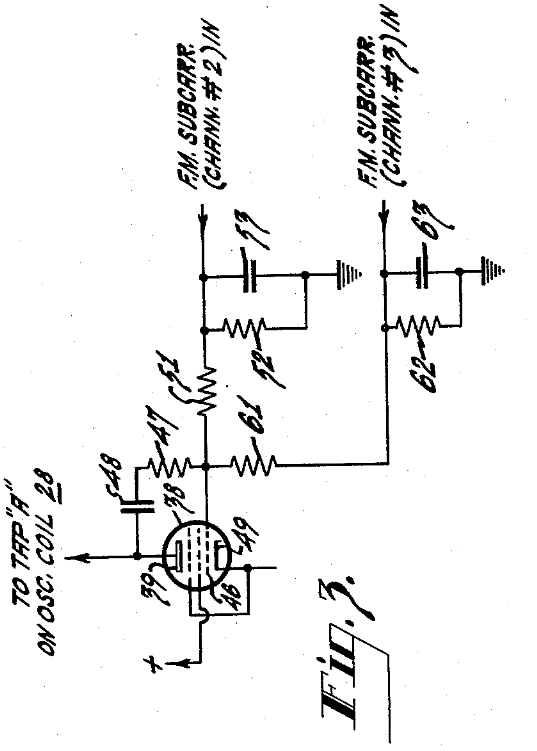
FIG. 3 is a modification of a portion of the FIG. 1 circuit, illustrating how two frequency modulated subcarriers could be applied thereto, to provide for a three-channel FM multiplex transmitter.

The circuit arrangement so far described is quite similar to that disclosed in FIG. 3 of Crosby United States Patent No. 2,250,095.

A pentode vacuum tube 31, for example of the 6AQ5 type, is used as the frequency modulated oscillator. The anode 32 of this tube is connected to the upper end of tank coil 28, and the cathode of this tube is connected to ground. An intermediate point on coil 28 is connected to ground by way of a capacitor 33 which has low impedance at radio frequencies. The control grid 34 is coupled to the lower end of tank coil 28 by way of a direct current blocking capacitor 35, and a resistor 36 is connected from this grid to ground.

The frequency modulated oscillator as just described operates in the vicinity of 5–6 mc./s., such that when its output is multiplied in frequency by a factor of eighteen, it will be in the FM broadcast band, which in the United States extends from 88 to 108 mc./s. The Federal Communications Commission (FCC) has by regulation set the frequency limits of the band just referred to, and has also set a maximum frequency deviation (corresponding to 100% modulation) of ±75 kc./s. If one sub-channel is used in a multiplex system, it might be held to 15% modulation, and the main channel would then be held to 85% modulation. If two sub-channels were employed, they might be held to 15% modulation each, and the main channel would then be held to 70% modulation. The percentages mentioned are based on a 100% modulation of ±75 kc./s., as previously stated, so 15% modulation would be a little in excess of ±11 kc./s.

For multiplex purposes, using a frequency modulated subcarrier, this subcarrier must be supersonic, and also below 75 kc./s., the latter limit being effective because of the FCC-set maximum modulating frequency of 75 kc./s. This could mean that the subcarrier frequency should be between 20 and 75 kc./s. As a practical matter, however, and to allow for frequency deviation at both ends of the aforesaid range, the subcarrier of a FM multiplex system may preferably be in the 32–67 kc./s. frequency range. As a typical example, if one sub-channel is combined with the main channel in multiplex fashion according to this invention, the sub-channel signal may be a 67-kc. subcarrier which is frequency modulated in accordance with intelligence such as audio contained in a second multiplex channel (which is the first sub-channel), with a maximum frequency deviation of ±7.5 kc./s. If a second sub-channel is added, the second sub-channel may employ a subcarrier frequency of 42 kc./s., this second subcarrier being frequency modulated in accordance with intelligence such as audio contained in a third multiplex channel (which is the second sub-channel), again with a maximum frequency deviation on the order of ±7.5 kc./s.

If the main channel (multiplex channel No. 1) program and the frequency modulated subcarrier (constituting multiplex channel No. 2) were applied to the same reactance tubes 9 and 15, as would be done in a conventional modulation arrangement, the result would be severe cross-talk from the main channel into the sub-channel, due to tube nonlinearites, direct interaction, etc. According to this invention, however, as will now be described, a second (separate) reactance tube is added to the circuit, and to this last-mentioned reactance tube is applied the frequency modulated subcarrier constituting the multiplex channel No. 2 signal.

Referring again to FIG. 1, a pentode vacuum tube 38, for example of the 6CL6 type, is connected to act as a separate reactance tube, for direct frequency modulation of the oscillator 28, 31, in addition to the direct frequency modulation of such oscillator produced as a result of the action of tubes 9 and 15. The anode 39 of tube 38 is preferably connected to an intermediate point A on the oscillator coil 28, which point may be near the lower end thereof. Because of this connection, the sub-channel reactance tube 38 is coupled to only a small part of the oscillator tank coil, in order to reduce the loading of the oscillator by such tube. This coupling of reactance tube 38 to only part of the oscillator coil (it will be recalled that reactance tubes 9 and 15 are coupled to the entire oscillator coil) also helps to reduce interaction between the tubes 9 and 15, on the one hand, and tube 38, on the other hand; the less such interaction is, of course, the smaller is the cross-talk between the two channels.

Another reason for the use of only a small part of the oscillator coil by the sub-channel reactance tube is that the frequency deviation for the sub-channel is less than that for the main channel. If desired, however, the entire oscillator coil can be used for the sub-channel reactance tube 38.

The circuit arrangement is such that in the anode circuits of the reactance tubes there is a very low impedance for input (modulation) frequencies, thus preventing the appearance therein of any appreciable voltages of these frequencies. The impedance in the anode circuits is low even for the subcarrier frequency, which is on the order of 67 kc./s. As will be more clearly pointed out hereinafter, this subcarrier frequency (which is frequency modulated) is applied to the tube 38 for frequency modulation of the oscillator. The aforementioned low impedance in the anode circuits is brought about by the suitable choice of values for capacitors 33 and 42 and for the choke 40 in the lead between a tap B on coil 28 and the direct current screen grid and anode supply lead 41. Bypass capacitor 42 is connected from lead 41 to ground. The low-impedance characteristics of the reactance tube anode circuits at input (modulation) signal frequencies, as stated, prevent the building up of any appreciable voltages at these frequencies, thus effectively decoupling the two separate modulation circuits so that the cross-talk from the main channel into the sub-channel is down at least 55 db from the main channel signal level.

The screen grids of reactance tubes 9, 15, and 38 are connected directly to unidirectional supply lead 41, while the screen grid of oscillator tube 31 is connected by means of a resistor 43 to lead 41. The anodes of tubes 9, 15, 31, and 38 are connected to lead 41 by way of choke 40 and coil 28. Lead 41 is connected by way of a series choke 44 and a feed-through (bypass) capacitor 45 to the positive terminal +150 v. of a suitable unidirectional potential source.

In order to provide the necessary quadrature radio frequency voltage on control grid 46 of tube 38 (such that this tube will operate as a reactance tube), a resistance-capacitance phase shift network is utilized. Such network includes a resistor 47, one end of which is connected to grid 46 and the other end of which is coupled to anode 39 through a direct current blocking capacitor 48, and the grid-cathode interelectrode capacitance of tube 38. The cathode 49 is returned to ground (the zero signal potential point and also the negative terminal of the power supply) through a resistance-capacitance network 50.

In a manner to be described more in detail hereinafter, a frequency modulated subcarrier is produced. This subcarrier is made to deviate about some rest frequency such as 67 kc./s. in accordance with audio modulation, or whatever other modulation is used in multiplex channel No. 2. The maximum frequency deviation of this subcarrier, in response to modulation, may be ±7.5 kc./s. Insofar as the frequency modulated oscillator 28, 31 is concerned, the frequency modulated 67-kc. signal constitutes the second multiplex channel (sub-channel) to be frequency modulated (by means of reactance tube 38) onto the oscillator output, along with the audio signal of the first multiplex channel (main channel), which latter is frequency modulated onto the oscillator output by means of tubes 9 and 15, in the manner previously described. The frequency modulated subcarrier (channel No. 2) signal is applied by way of a resistor 51 to control grid 46 of tube 38. A resistor 52 is connected from the FM subcarrier input lead to ground, in parallel with a capacitor 53. Thus, the frequency modulated subcarrier signal of multiplex channel No. 2 is applied to the grid of reactance tube 38, to produce direct FM of the oscillator 28, 31, along with the FM thereof produced directly by reactance tubes 9, 15 (which are coupled to the same oscillator coil 28 as is reactance tube 38).

The frequency modulated multiplex signal (which, as stated, may be in the vicinity of 5–6 mc./s.) is taken off from point A on the oscillator coil 28, and fed through a coupling capacitor 54 to the first of a series of frequency multipliers, followed by suitable power amplifiers, to bring the FM signal level to the proper power level and frequency for radiation from a transmitting antenna. The intermediate tap point A is utilized for the output in order to minimize loading of the oscillator coil by the following frequency multiplier stage.

For frequency control purposes, a sample of the output of the frequency modulated oscillator is taken off from tap point A and fed through a capacitor 55 to the input of an automatic frequency control system 17. In the system 17, the 5–6 mc. FM signal is first divided down (a division factor of 240 may be used here) by a series of frequency dividers, and then compared in a phase detector with the output of a crystal-stabilized reference frequency oscillator. Any deviations in the center or average frequency of the frequency modulated oscillator from a predetermined value thus appear as corresponding control voltages on the automatic frequency control system output lead 56, and these voltages are applied by way of resistor 16 and winding 6 and winding 13 to the reactance tube control grid 14. The application of these voltages to the reactance tube 15 is in such a sense as to return the center frequency of oscillator 28, 31 to the correct value. In this connection, it is pointed out that the frequency stability of the frequency modulated oscillator, and the functioning of the automatic frequency control system 17, are not at all impaired by the addition of the second reactance tube 38.

The following values for certain of the circuit components are given by way of example. These were the values used in a circuit arrangement according to this invention which was built and successfully tested.

Resistor:

| | | |
|---|---|---|
| 10 | ohms | 2200 |
| 11 | do | 15,000 |
| 12 | do | 2700 |
| 16 | do | 2200 |
| 18 | do | 15,000 |
| 19 | do | 2700 |
| 36 | do | 18,000 |
| 43 | do | 100,000 |
| 47 | do | 33,000 |
| In network 50 | do | 1500 |
| 51 | do | 22,000 |
| 52 | do | 10,000 |

Capacitor:

| | | |
|---|---|---|
| 33 | mfd | 0.01 |
| 35 | mmfd | 820 |
| 37 | mmfd | 68 |
| 42 | mfd | 0.01 |
| 45 | mfd | 0.001 |
| 48 | mfd | 0.001 |
| In network 50 | mfd | 0.1 |
| 53 | mfd | 0.001 |

Figure 2:
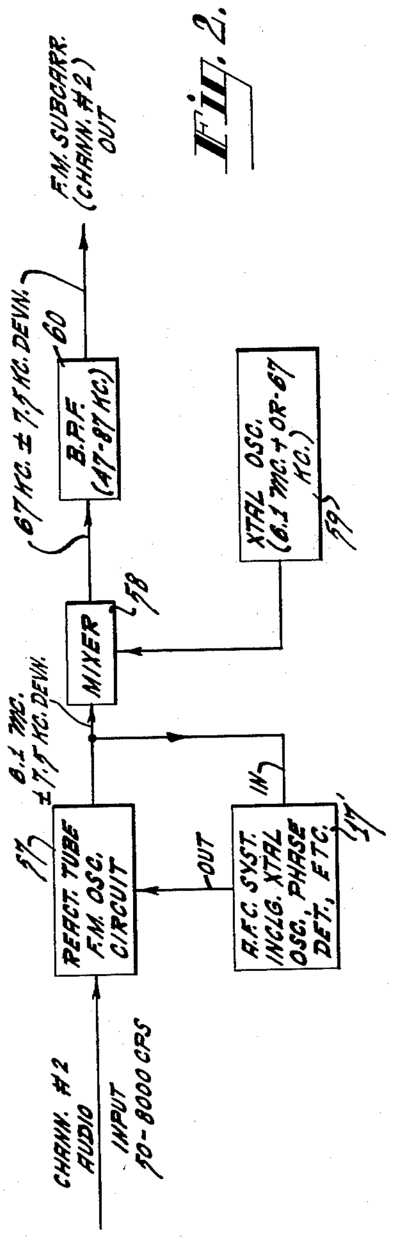
FIG. 2 is a block diagram of an arrangement for producing the frequency modulated subcarrier wave.

The frequency modulated subcarrier signal (representing multiplex channel No. 2 and fed to the control grid of reactance tube 38) may advantageously be produced by the circuit arrangement illustrated in FIG. 2. The channel No. 2 audio input, which may include a range of frequencies extending from 50 to 8000 c.p.s., is applied to the input of a reactance tube frequency modulated oscillator circuit 57, the application here preferably being through a pre-emphasis network (not shown), just as in FIG. 1. The circuit 57 is preferably a push-pull reactance tube FM oscillator circuit using an arrangement of tubes similar to tubes 9, 15, and 31 in FIG. 1, but not including the additional reactance tube 38. In other words, the circuit 57 would correspond to the circuitry used for the main channel only in FIG. 1. The frequency modulated oscillator in circuit 57 might operate at a rest or center frequency of 6.1 mc./s., for example, and would be directly frequency modulated by the reactance tubes in circuit 57 (operating in accordance with the channel No. 2 audio input) to provide, for example, a maximum deviation of ±7.5 kc./s.

The frequency modulated output of circuit 57 is combined in a mixer with the output of a crystal oscillator 59, operating at a frequency 67 kc./s. above or below 6.1 mc./s., to produce in the output of this mixer a frequency modulated beat frequency wave of 67 kc., with a maximum frequency deviation of ±7.5 kc./s. This particular beat frequency signal is selected from the output of mixer 58 by means of a bandpass filter 60, which may pass a band of frequencies extending from 47 to 87 kc./s. The 67-kc. frequency modulated subcarrier appearing at the output of filter 60 is the frequency modulated subcarrier comprising multiplex channel No. 2, which is applied to the reactance tube 38 of FIG. 1.

An automatic frequency control system 17', which may correspond in essential details to system 17 of FIG. 1, operates to control the center or average frequency of the frequency modulated oscillator of circuit 57. System 17' may be connected into the circuitry of FIG. 2 in the same manner as is system 17 in FIG. 1.

It is possible to add a second sub-channel to the FM multiplex oscillator, so as to provide a total of three multiplex channels in the oscillator output. This second sub-channel, like the first sub-channel, would comprise a subcarrier of supersonic frequency, frequency modulated by the third program (audio, or whatever other modulation is used). FIG. 3 illustrates an arrangement whereby two sub-channels, each comprising a frequency modulated subcarrier, may be added to the output of the frequency modulated oscillator, in addition to the main channel.

In FIG. 3, the frequency modulated subcarrier comprising multiplex channel No. 2 is applied to reactance tube 38 in exactly the same way as in FIG. 1. Another frequency modulated subcarrier, comprising multiplex channel No. 3, may be developed in the same manner as in FIG. 2, but, as previously stated, this second subcarrier may be a 42-kc. FM signal. The frequency modulated subcarrier comprising multiplex channel No. 3 is fed through a resistor 61 to the control grid 46 of reactance tube 38. A resistor 62 is connected from this latter FM subcarrier input lead to ground, in parallel with a capacitor 63. Thus, the FM subcarrier signals representing channels No. 2 and No. 3 are combined by means of the resistive network 51, 61, etc., and the combination is applied to grid 46 of the reactance tube 38. Direct FM of the oscillator 28, 31 is then produced by both the channel No. 2 and No. 3 FM subcarriers, along with the FM thereof produced by the audio signal of channel No. 1.

Although the No. 2 and No. 3 FM subcarriers are both fed to the same reactance tube 38 in FIG. 3, this does not result in any difficulty, as far as cross-talk is concerned, because the two sub-channel signals are both of substantially the same strength or amplitude level. Cross-talk between two channels of the same signal strengths is inappreciable, and it is only when there is a considerable difference in signal strengths in the two channels (as is necessarily the case with the main and sub-channels, in the present environment) that any attention needs to be paid to cross-talk. In addition, the two subcarriers are modulated waves themselves, and are separately demodulated, following individual filters, in the receiver, so that the filters will remove any cross-talk between the two subcarriers. The same advantage obtained in FIG. 1, to wit, the substantial reduction of cross-talk from the main channel into the sub-channels, is obtained in the FIG. 3 arrangement.

The audio signals comprising channel No. 1 (and fed to reactance tubes 9 and 15 in FIG. 1) may constitute a program which is entirely different from the audio signals comprising channel No. 2 (and fed to the reactance tube circuit 57 in FIG. 2, to frequency modulate the subcarrier). Alternatively, the FM multiplex transmitter of this invention can be used for stereophonic transmission of audio programs. In this latter case, the audio signals comprising channel No. 1 would be derived from one of two spaced microphones (and would thus constitute one "stereo" channel), and the audio signals comprising channel No. 2, and used to frequency modulate the subcarrier, would be derived from the other of the two microphones (and would thus constitute the second "stereo" channel). For stereophonic transmission by multiplex means, the requirements as to the amount of cross-talk are of course not as severe or as stringent as when two entirely different programs are being multiplexed onto the common carrier. In both of the cases so far mentioned in this paragraph, however, non-identical intelligence is present in the two multiplex channels. The principles of this invention are also applicable to situations wherein identical intelligence is present in both of the multiplex channels. But, in this latter case the principal reason for multiplex transmission is of course not utilized.

The term "angular-velocity modulation transmitters" has been commonly used in the art to refer to FM transmitters since such transmitters effect FM (which is one form of angular-velocity modulation) of a carrier wave, in response to modulating signals.

What is claimed is:

1. An angular-velocity modulation multiplex transmitter comprising an oscillator having a tank circuit which includes a coil; a first reactance tube electrically coupled to said coil, a second reactance tube electrically coupled to a part only of said coil, means for feeding the intelligence constituting a first multiplex channel as modulation to said first tube, and means for feeding the intelligence constituting a second multiplex channel as modulation to said second tube, thereby to angular-velocity modulate said oscillator by the joint action of both of said reactance tubes.

2. An angular-velocity modulation multiplex transmitter comprising a carrier frequency oscillator having a tank circuit which includes a coil; a first reactance tube electrically coupled to said coil, a second reactance tube electrically coupled to a part only of said coil, means for feeding the intelligence constituting a first multiplex channel as modulation to said first tube, means for producing a subcarrier wave, means for modulating said subcarrier wave by the intelligence constituting a second multiplex channel, and means for feeding the modulated subcarrier wave as modulation to said second tube, thereby to angular-velocity modulate said carrier frequency oscillator by the joint action of both of said reactance tubes.

3. An angular-velocity modulation multiplex transmitter comprising a carrier frequency oscillator having a tank circuit which includes a coil; a first reactance tube electrically coupled to said coil, a second reactance tube electrically coupled to a part only of said coil, means for feeding the intelligence constituting a first multiplex channel as modulation to said first tube, means for producing a subcarrier wave, means for angular-velocity modulating said subcarrier wave in accordance with the intelligence constituting a second multiplex channel, and means for feeding the angular-velocity modulated subcarrier wave as modulation to said second tube, thereby to angular-velocity modulate said carrier frequency oscillator by the joint action of both of said reactance tubes.

4. An angular-velocity modulation multiplex transmitter comprising an oscillator having a tank circuit which includes a coil; a first reactance tube electrically coupled to said coil, a second tube having at least anode, cathode, and grid electrodes; means connecting said anode electrode to a first point on said coil, a phase shift network coupling said grid electrode to said anode electrode, means connecting said cathode electrode to a second point on said coil, whereby said second tube acts as a second reactance tube electrically coupled to said coil, means for feeding the intelligence constituting a first multiplex channel as modulation to said first tube, and means for feeding the intelligence constituting a second multiplex channel as modulation to said grid electrode, thereby to angular-velocity modulate said oscillator by the joint action of both of said reactance tubes.

5. An angular-velocity modulation multiplex transmitter comprising an oscillator having a tank circuit which includes a coil; a first reactance tube electrically coupled to said coil, a second tube having at least anode, cathode, and grid electrodes; means connecting said anode electrode to an intermediate point on said coil, a phase shift network coupling said grid electrode to said anode electrode, means connecting said cathode electrode to a second point on said coil which is spaced from said intermediate point, whereby said second tube acts as a second reactance tube electrically coupled to said coil, means for feeding the intelligence constituting a first multiplex channel as modulation to said first tube, and means for feeding the intelligence constituting a second multiplex channel as modulation to said grid electrode, thereby to angular-velocity modulate said oscillator by the joint action of both of said reactance tubes.

6. An angular-velocity modulation multiplex transmitter comprising a carrier frequency oscillator having a tank circuit which includes a coil; a first reactance tube electrically coupled to said coil, a second tube having at least anode, cathode, and grid electrodes; means connecting said anode electrode to a first point on said coil, a phase shift network coupling said grid electrode to said anode electrode, means connecting said cathode electrode to a second point on said coil, whereby said second tube acts as a second reactance tube electrically coupled to said coil, means for feeding the intelligence constituting a first multiplex channel as modulation to said first tube, means for producing a subcarrier wave, means for modulating said subcarrier wave by the intelligence constituting a second multiplex channel, and means for feeding the modulated subcarrier wave as modulation to said grid electrode, thereby to angular-velocity modulate said carrier frequency oscillator by the joint action of both of said reactance tubes.

7. An angular-velocity modulation multiplex transmitter comprising a carrier frequency oscillator having a tank circuit which includes a coil; a first reactance tube electrically coupled to said coil, a second tube having at least anode, cathode, and grid electrodes; means connecting said anode electrode to an intermediate point on said coil, a phase shift network coupling said grid electrode to said anode electrode, means connecting said cathode electrode to a second point on said coil which is spaced from said intermediate point, whereby said second tube acts as a second reactance tube electrically coupled to said coil, means for feeding the intelligence constituting a first multiplex channel as modulation to said first tube, means for producing a subcarrier wave, means for modulating said subcarrier wave by the intelligence constituting a second multiplex channel, and means for feeding the modulated subcarrier wave as modulation to said second tube, thereby to angular-velocity modulate said carrier frequency oscillator by the joint action of both of said re-reactance tubes.

8. An angular-velocity modulation multiplex transmitter comprising a carrier frequency oscillator having a tank circuit which includes a coil; a first reactance tube electrically coupled to said coil, a second tube having at least anode, cathode, and grid electrodes; means connecting said anode electrode to a first point on said coil, a phase shift network coupling said grid electrode to said anode electrode, means connecting said cathode electrode to a second point on said coil, whereby said second tube acts as a second reactance tube electrically coupled to said coil, means for feeding the intelligence constituting a first multiplex channel as modulation to said first tube, means for producing a subcarrier wave, means for angular-velocity modulating said subcarrier wave in accordance with the intelligence constituting a second multiplex channel, and means for feeding the angular-velocity modulated subcarrier wave as modulation to said grid electrode, thereby to angular-velocity modulate said carrier frequency oscillator by the joint action of both of said reactance tubes.

9. A FM multiplex transmitter comprising a carrier frequency oscillator having a tank circuit which includes a coil; a first reactance tube electrically coupled to said coil, a second tube having at least anode, cathode, and grid electrodes; means connecting said anode electrode to an intermediate point on said coil, a phase shift network coupling said grid electrode to said anode electrode, means connecting said cathode electrode to a second point on said coil which is spaced from said intermediate point, whereby said second tube acts as a second reactance tube electrically coupled to said coil, means for feeding the intelligence constituting a first multiplex channel as modulation to said first tube, means for producing a subcarrier wave, means for frequency modulating said subcarrier wave in accordance with the intelligence constituting a second multiplex channel, and means for feeding the frequency modulated subcarrier wave as modulation to said grid electrode, thereby to frequency modulate said carrier frequency oscillator by the joint action of both of said reactance tubes.

10. An angular-velocity modulation multiplex transmitter comprising an oscillator having a tank circuit which includes a coil; a first reactance tube electrically coupled to said coil, a second tube having at least anode, cathode, and grid electrodes; means connecting said anode electrode to a first point on said coil, a phase shift network coupling said grid electrode to said anode electrode, means connecting said cathode electrode to a second point on said coil, whereby said second tube acts as a second reactance tube electrically coupled to said coil, means for feeding the intelligence constituting a first multiplex channel as modulation to said first tube, means for feeding the intelligence constituting a second multiplex channel as modulation to said grid electrode, thereby to angular-velocity modulate said oscillator by the joint action of both of said reactance tubes to provide a frequency modulated multiplex signal, and output means for said frequency modulated multiplex signal connected to said first point on said coil.

11. A multiple channel modulated carrier wave generator comprising a carrier frequency oscillation generator having a tank circuit, a first reactance tube coupled to said tank circuit, a second reactance tube coupled to said tank circuit, means for feeding the intelligence constituting a first channel as modulation to said first reactance tube, means for producing a subcarrier wave, means for modulating said subcarrier wave in accordance with other intelligence constituting a second channel, and means for feeding the modulated subcarrier wave as modulation to said second reactance tube, thereby to angularly modulate the oscillations of said carrier frequency generator by the joint action of both of said reactance tubes.

12. A multiple channel modulated carrier wave generator comprising a carrier wave frequency oscillation generator having a tank circuit, a first reactance tube coupled to said tank circuit, a second reactance tube coupled to said tank circuit, means for feeding the intelligence constituting a first channel as modulation, to said first reactance tube, means for producing a subcarrier wave, means for modulating said subcarrier wave in accordance with other intelligence constituting a second channel, and means for feeding the modulated subcarrier wave as modulation to said second reactance tube, thereby to angularly modulate said carrier frequency wave generator by the joint action of both of said reactance tubes, said couplings being arranged to reduce interaction between the reactance tubes.

13. A multiple channel modulated carrier wave generator comprising a carrier wave frequency oscillation generator having a tank circuit, a first reactance tube coupled to said tank circuit, a second reactance tube coupled to said tank circuit, means for feeding the intelligence constituting a first channel as modulation to said first reactance tube, means for producing a subcarrier wave, means for modulating said subcarrier wave in accordance with other intelligence constituting a second channel, and means for feeding the modulated subcarrier wave as modulation to said second reactance tube, thereby to angularly modulate said carrier wave frequency oscillation generator by the joint action of both of said reactance tubes, said couplings being arranged to impart to said oscillation generator predetermined amounts of angular modulation by each channel.

14. A multiple channel modulated carrier wave generator comprising a carrier frequency oscillation generator having a tank circuit, a first reactance device coupled to said tank circuit, a second reactance device coupled to said tank circuit, means for feeding the intelligence constituting a first channel as modulation to said first reactance device, means for producing a subcarrier wave, means for modulating said subcarrier wave in accordance with other intelligence constituting a second channel, and means for feeding the modulated subcarrier wave as modulation to said second reactance device, thereby to angularly modulate the oscillations of said carrier frequency generator by the joint action of both of said reactance devices.

References Cited in the file of this patent

UNITED STATES PATENTS

| | | |
|---|---|---|
| 2,322,588 | Peterson | June 22, 1943 |
| 2,476,162 | Thompson | July 12, 1949 |
| 2,584,780 | Beard et al. | Feb. 5, 1952 |
| 2,609,535 | Harmon | Sept. 2, 1952 |
| 2,610,297 | Leed | Sept. 9, 1952 |
| 2,724,802 | Oschmann | Nov. 22, 1955 |
| 2,830,176 | Howell et al. | Apr. 8, 1958 |